US011556833B2

(12) United States Patent
Coady et al.

(10) Patent No.: US 11,556,833 B2
(45) Date of Patent: Jan. 17, 2023

(54) PERFORMING QUANTUM FILE CONCATENATION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 155 days.

(21) Appl. No.: 16/912,091

(22) Filed: Jun. 25, 2020

(65) Prior Publication Data

US 2021/0406748 A1   Dec. 30, 2021

(51) Int. Cl.
G06F 15/16    (2006.01)
G06N 10/00    (2022.01)
G06F 16/16    (2019.01)
G06F 16/17    (2019.01)

(52) U.S. Cl.
CPC .......... G06N 10/00 (2019.01); G06F 16/162 (2019.01); G06F 16/1734 (2019.01)

(58) Field of Classification Search
None
See application file for complete search history.

(56) References Cited

U.S. PATENT DOCUMENTS

| | | |
|---|---|---|
| 7,451,292 B2 | 11/2008 | Routt |
| 7,639,035 B2 | 12/2009 | Berkley |
| 7,853,011 B2 | 12/2010 | Kuang et al. |
| 8,102,185 B2 | 1/2012 | Johansson et al. |
| 8,434,027 B2 | 4/2013 | Jones |
| 8,600,051 B2 | 12/2013 | Noh |
| 8,959,115 B2 | 2/2015 | Marathe |
| 9,264,226 B2 | 2/2016 | Harrison et al. |
| 9,495,644 B2 | 11/2016 | Chudak et al. |
| 9,509,506 B2 | 11/2016 | Hughes et al. |
| 9,774,401 B1 | 9/2017 | Borrill |

(Continued)

FOREIGN PATENT DOCUMENTS

| | | |
|---|---|---|
| CN | 105164704 B | 7/2018 |
| CN | 109816112 A | 5/2019 |

(Continued)

OTHER PUBLICATIONS

Cheng, et al. Quantum Switching and Quantum Merge Sorting. IEEE Transactions on Circuits and Systems 53:2, 2006, pp. 316-325. (Year: 2006).*

(Continued)

*Primary Examiner* — Alex Gofman
*Assistant Examiner* — Shelly X Qian
(74) *Attorney, Agent, or Firm* — Dority & Manning, P.A.

(57) ABSTRACT

Performing quantum file concatenation is disclosed herein. In one example, a quantum file manager receives a request to concatenate a first quantum file comprising a first plurality of qubits and a second quantum file comprising a second plurality of qubits. Responsive to receiving the request, the quantum file manager concatenates the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits.

10 Claims, 10 Drawing Sheets

(56) References Cited

U.S. PATENT DOCUMENTS

| | | | |
|---|---|---|---|
| 9,847,913 | B2 | 12/2017 | Kanda et al. |
| 9,887,976 | B2 | 2/2018 | Hughes et al. |
| 10,331,658 | B2 | 6/2019 | Pennefather et al. |
| 10,592,216 | B1 | 3/2020 | Richardson et al. |
| 2003/0121028 | A1 | 6/2003 | Coury et al. |
| 2012/0093521 | A1 | 4/2012 | Harrison et al. |
| 2013/0308956 | A1 | 11/2013 | Meyers et al. |
| 2014/0365843 | A1 | 12/2014 | Ashikhmin |
| 2016/0071021 | A1 | 3/2016 | Raymond |
| 2017/0351974 | A1 | 12/2017 | Rose et al. |
| 2018/0091440 | A1 | 3/2018 | Dadashikelayeh et al. |
| 2018/0144262 | A1 | 3/2018 | Roetteler et al. |
| 2018/0365585 | A1* | 12/2018 | Smith ............... G06F 9/3877 |
| 2019/0042971 | A1 | 2/2019 | Zou |
| 2019/0179730 | A1 | 6/2019 | Geller et al. |
| 2020/0074346 | A1 | 3/2020 | Griffin et al. |
| 2020/0125402 | A1 | 4/2020 | Griffin et al. |
| 2020/0184025 | A1 | 6/2020 | Horii et al. |
| 2020/0184031 | A1 | 6/2020 | Horii |
| 2020/0201655 | A1* | 6/2020 | Griffin ............... G06N 10/00 |
| 2020/0227522 | A1 | 7/2020 | Leipold et al. |
| 2020/0313063 | A1 | 10/2020 | Pollanen et al. |
| 2020/0374211 | A1 | 11/2020 | Griffin et al. |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |

FOREIGN PATENT DOCUMENTS

| | | | |
|---|---|---|---|
| JP | 6465876 | B2 | 2/2019 |
| WO | 2016206498 | A1 | 12/2016 |
| WO | 2018111242 | A1 | 6/2018 |

OTHER PUBLICATIONS

Whitehouse. Data deduplication methods: Block-level versus byte-level dedupe, https://searchdatabackup.techtarget.com/tip/, 2008, pp. 1-3. (Year: 2008).*

Python Join Two Lists, https://www.w3schools.com/python/gloss_python_join_lists.asp, Feb. 2020, pp. 1-5. (Year: 2020).*

Barnum, H. et al., "Authentication of Quantum Messages," Proceedings of the 43rd Annual IEEE Symposium on Foundations of Computer Science, Nov. 2002, IEEE, 10 pages.

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://speclium.ieee.org/tech-talk/computing/hardware/a-quantum-bus-for-quantum-computers, 3 pages.

Gühne, O., et al., "Entanglement detection," Physics Reports, vol. 474, No. 1, Feb. 27, 2009, 90 pages.

Lee, C., "New form of qubit control may yield longer computation times," Ars Technica, Jan. 26, 2018, Wired Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

Yang, C., et al., "Entanglement generation and quantum information transfer between spatiallY-separated qubits in different cavities," New Journal of Physics, vol. 15, Nov. 1, 2013, 19 pages.

U.S. Appl. No. 15/930,025, filed May 12, 2020.
U.S. Appl. No. 16/884,928, filed May 27, 2020.
U.S. Appl. No. 16/859,571, filed Apr. 27, 2020.
U.S. Appl. No. 16/912,045, filed Jun. 25, 2020.
U.S. Appl. No. 16/912,200, filed Jun. 25, 2020.
U.S. Appl. No. 16/909,477, filed Jun. 23, 2020.

Non-Final Office Action for U.S. Appl. No. 15/930,025, dated Oct. 1, 2021, 10 pages.

Non-Final Office Action for U.S. Appl. No. 16/859,571, dated Oct. 28, 2021, 9 pages.

Notice of Allowance for U.S. Appl. No. 16/227,747, dated Jun. 10, 2021, 7 pages.

Applicant-Initiated Interview Summary for U.S. Appl. No. 15/930,025, dated Dec. 17, 2021, 3 pages.

* cited by examiner

PERFORMING QUANTUM FILE CONCATENATION

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to programmatically manipulate quantum files comprising a plurality of qubits will be desirable.

SUMMARY

The examples disclosed herein implement a quantum file management system that performs concatenation of quantum files that each comprise a plurality of qubits. Given a first quantum file comprising a first plurality of qubits and a second quantum file comprising a second plurality of qubits, a concatenated quantum file comprising a third plurality of qubits is generated, wherein the third plurality of qubits comprises a same number of qubits as a union of the first plurality of qubits and the second plurality of qubits and stores an identical sequence of data values (i.e., the same data values, in the same order) as the first plurality of qubits followed by the second plurality of qubits. In some examples, concatenation may be accomplished by appending the second plurality of qubits to the first quantum file (i.e., the "concatenated quantum file" is the first quantum file and the "third plurality of qubits" is the union of the first plurality of qubits and the second plurality of qubits), and deleting the second quantum file. Some examples may provide that concatenation is performed by copying the second plurality of qubits into a fourth plurality of qubits, and appending the fourth plurality of qubits to the first quantum file (thus preserving the second quantum file). According to some examples, concatenation may be accomplished by appending the first quantum file and the second quantum file into a new concatenated quantum file, and then either deleting or preserving the first and second quantum files.

In another example, a method for performing quantum file concatenation is provided. The method comprises receiving, by a quantum file manager executing on at least one processor device, a request to concatenate a first quantum file comprising a first plurality of qubits and a second quantum file comprising a second plurality of qubits. The method further comprises, responsive to receiving the request, concatenating, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits.

In another example, a quantum computing system for performing quantum file concatenation is provided. The quantum computing system comprises a quantum computing device that comprises a memory and at least one processor device coupled to the memory. The at least one processor device is to receive, by a quantum file manager executing on the at least one processor device, a request to concatenate a first quantum file comprising a first plurality of qubits and a second quantum file comprising a second plurality of qubits. The at least one processor device is further to, responsive to receiving the request, concatenate, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits.

In another example, a computer program product is provided. The computer program product comprises a non-transitory computer-readable medium having stored thereon computer-executable instructions which, when executed, cause a processor device to receive, by a quantum file manager executing on the processor device, a request to concatenate a first quantum file comprising a first plurality of qubits and a second quantum file comprising a second plurality of qubits. The computer-executable instructions further cause the processor device to, responsive to receiving the request, concatenate, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
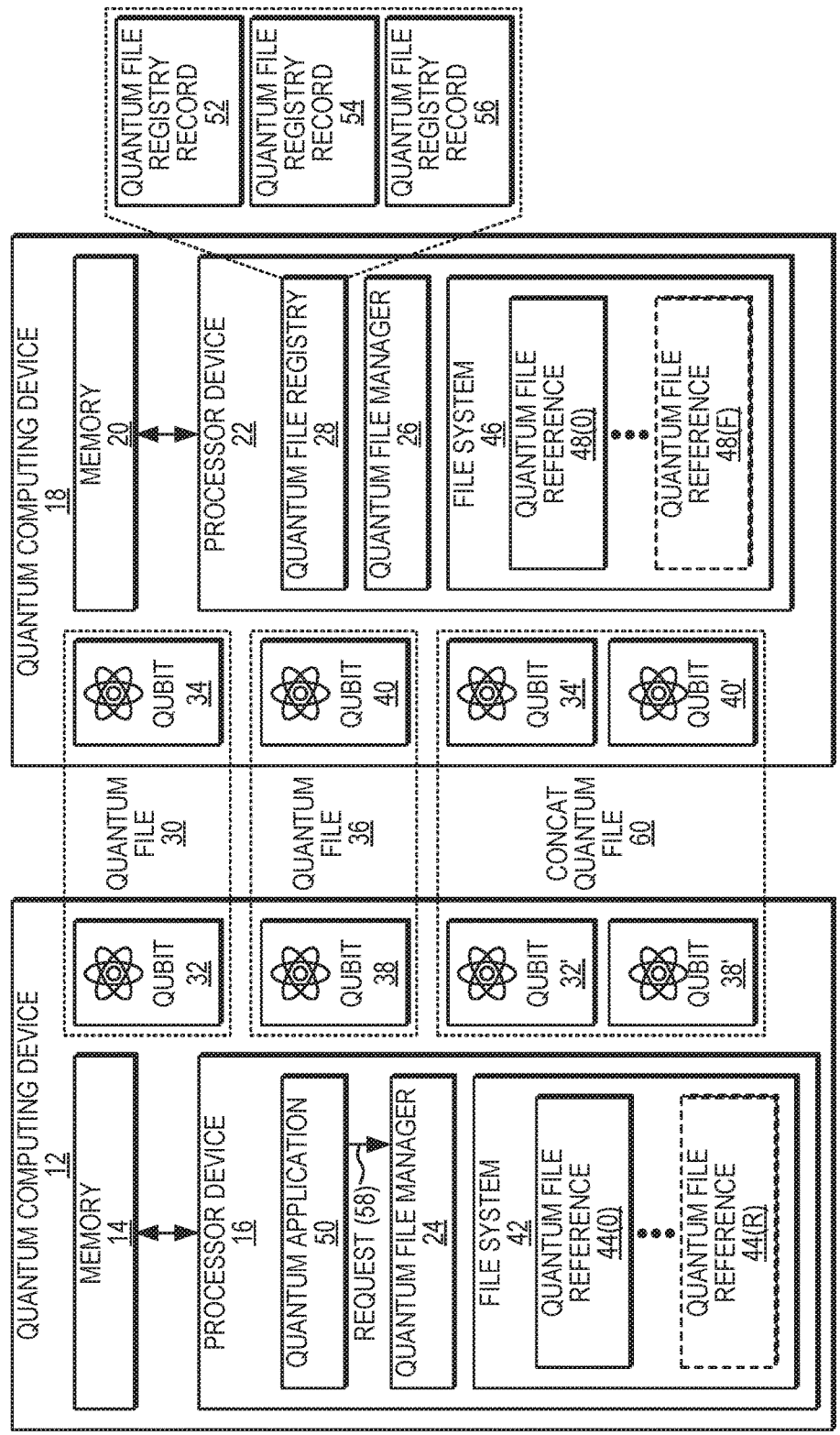
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. As quantum computing continues to increase in popularity and become more commonplace, an ability to programmatically manipulate quantum files comprising a plurality of qubits will be desirable.

In this regard, the examples disclosed herein implement a quantum file management system that performs concatenation of quantum files that each comprise a plurality of qubits. Given a first quantum file comprising a first plurality of qubits and a second quantum file comprising a second plurality of qubits, a quantum file manager generates a concatenated quantum file comprising a third plurality of qubits, where the third plurality of qubits comprises a same number of qubits as a union of the first plurality of qubits and the second plurality of qubits and stores an identical sequence of data values (i.e., the same data values, in the same order) as the first plurality of qubits followed by the second plurality of qubits. In some examples, concatenation may be accomplished by appending the second plurality of qubits to the first quantum file and deleting the second quantum file, while some examples may provide that concatenation is performed by copying the second plurality of qubits into a fourth plurality of qubits, and appending the fourth plurality of qubits to the first quantum file (thus preserving the second quantum file). According to some examples, concatenation may be accomplished by appending the first quantum file and the second quantum file into a new concatenated quantum file, and then either deleting or preserving the first and second quantum files.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 may be close in physical proximity to one another, or may be relatively long distances from one another (e.g., hundreds or thousands of miles from one another). The quantum computing device 12 and the quantum computing device 18 operate in quantum environments, but can operate using classical computing principles or quantum computing principles. When using quantum computing principles, the quantum computing device 12 and the quantum computing device 18 perform computations that utilize quantum-mechanical phenomena, such as superposition and/or entanglement. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1).

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 24 and 26, which operate to implement quantum files on the quantum computing device 12 and the quantum computing device 18, respectively. The quantum file management system also includes a quantum file registry 28 that includes metadata regarding each quantum file implemented in the quantum computing system 10, as discussed in greater detail below.

In the example of FIG. 1, the quantum computing system 10 implements a quantum file 30 that is made up of two (2) qubits: a qubit 32 that is hosted on the quantum computing device 12, and a qubit 34 hosted on the quantum computing device 18. The quantum computing system 10 also implements a quantum file 36 that is made up of a qubit 38 that is hosted on the quantum computing device 12, and a qubit 40 hosted on the quantum computing device 18. For purposes of this example, both the quantum file 30 and the quantum file 36 are "owned" by the quantum computing device 12. However, it is to be understood that ownership of the quantum files 30 and 36 may be migrated or transitioned from one quantum computing device to another. It is to be further understood that the quantum files 30 and 36 in some examples may comprise more qubits than illustrated in FIG. 1.

The quantum computing device 12 includes a file system 42 that includes one or more quantum file references 44(0)-44(R). Each of the quantum file references 44(0)-44(R) corresponds to a quantum file that is maintained in the quantum file registry 28 and that is "owned" by the quantum computing device 12. Thus, for example, the quantum file reference 44(0) may correspond to the quantum file 30. Likewise, the quantum computing device 18 includes a file system 46 that includes one or more quantum file references 48(0)-48(F). It is to be understood that the file system 46 provides functionality corresponding to the functionality of the file system 42 described herein.

In exemplary operation, a quantum file such as the quantum file 30 may be accessed by a requestor (e.g., a quantum application 50) via the quantum file reference 44(0), which is identified by the quantum application 50 via an identifier (not shown). The quantum application 50 provides the identifier to the quantum file manager 24 via any suitable inter-process communications mechanism, such as an application programming interface (API) or the like. In some examples, the quantum file manager 24 may be an integral part of a quantum operating system, and the appropriate intercommunication mechanisms between the quantum application 50 and the quantum file manager 24 may be generated in response to certain programming instructions, such as reading, writing, or otherwise accessing the quantum file 30 while the quantum application 50 is being compiled.

The quantum file manager 24 then accesses the file system 42. Based on the quantum file identifier provided by the quantum application 50, the quantum file manager 24 accesses the quantum file reference 44(0). The quantum file reference 44(0) includes information about the quantum file 30 such as an internal quantum file identifier for the quantum file 30, a location of a Quantum Assembly Language (QASM) file that contains programming instructions that access the quantum file 30, and/or metadata for the quantum file 30 (e.g., a creation timestamp of the quantum file 30, a last modification timestamp of the quantum file 30, and/or a current user of the quantum file 30, as non-limiting examples). The quantum file reference 44(0) may also identify each qubit that makes up the quantum file 30 (i.e., the qubits 32 and 34, in this example).

In some examples, data may be spread over the qubits 32 and 34 of the quantum file 30 in a manner that dictates that the qubits 32 and 34 must be accessed in some sequential order for the data to have contextual meaning. Accordingly, some examples may provide that the order in which the qubits 32 and 34 are identified in the quantum file reference 44(0) may correspond to the appropriate order in which the qubits 32 and 34 should be accessed. In other examples, the quantum file reference 44(0) may have an additional field identifying the appropriate order. Some examples may also provide that the quantum file reference 44(0) includes qubit entanglement status fields that indicate entanglement status information about the qubits 32 and 34.

In the example of FIG. 1, the quantum file manager 24, upon receiving an access request to a quantum file such as the quantum file 30, may access the quantum file registry 28 (using, e.g., a linking service (not shown)) to determine a current status of the quantum file 30. The quantum file registry 28 of FIG. 1 comprises a plurality of quantum file registry records 52, 54, and 56, each of which corresponds to a quantum file implemented in the quantum computing system 10. In this example, the quantum file registry record 52 corresponds to the quantum file 30, while the quantum file registry record 54 corresponds to the quantum file 36.

Each of the quantum file registry records 52, 54, and 56 includes current metadata regarding the corresponding quantum files. The metadata may include, as non-limiting examples, an internal file identifier of the corresponding quantum file, an indicator of a number of qubits that make up the corresponding quantum file, and, for each qubit of the number of qubits, a qubit identification field and an entanglement status field. The quantum file registry records 52, 54, and 56 each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like.

The quantum file manager 24 updates the quantum file reference 44(0) with the information from the quantum file registry record 52 and the outcome of any checks, and also updates the timestamp field 45 with the current time. The quantum file manager 24 then returns control to the quantum application 50, passing the quantum application 50 at least some of the updated information contained in the quantum file reference 44(0). The quantum application 50 may then initiate actions against the qubits 32 and 34, such as read actions, write actions, or the like.

One function provided by the quantum file managers 24 and 26 of FIG. 1 is the concatenation of quantum files. Accordingly, in the example of FIG. 1, the quantum file manager 24 may receive a request 58 from a requestor, such as the quantum application 50, to concatenate a first quantum file (e.g., the quantum file 30) comprising a first plurality of qubits (e.g., the qubits 32 and 34) and a second quantum file (e.g., the quantum file 36) comprising a second plurality of qubits (e.g., the qubits 38 and 40). The result is a concatenated quantum file ("CONCAT QUANTUM FILE") 60 that comprises a third plurality of qubits 32',34', 38', and 40'.

As discussed in greater detail below with respect to FIGS. 2A-2D, concatenation may be performed in a number of different ways depending on, e.g., whether the original quantum files are to be preserved or deleted, or whether the concatenated quantum file 60 is to be a new quantum file or one of the original quantum files. Thus, in one example, the concatenated quantum file 60 may be the quantum file 30, and the third plurality of qubits 32',34',38', and 40' may be the original qubits 32, 34, 38, and 40, respectively, that have all been assigned to the quantum file 30 (e.g., by updating the quantum file registry records 52 and 54). In another example, the concatenated quantum file 60 may be the quantum file 30, and the third plurality of qubits 32',34',38', and 40' may be the original qubits 32 and 34 and copies of the original qubits 38 and 40 that have been assigned to the quantum file 30. Some examples may provide that the concatenated quantum file 60 is a new quantum file that is defined by a new quantum file registry record (such as the quantum file registry record 56), and that is populated with the third plurality of qubits 32',34',38', and 40' comprising copies of the original qubits 32, 34, 38, and 40, respectively.

Before performing a concatenation operation, one or more checks may be performed on the qubits 32, 34, 38, and 40 comprising the quantum files 30 and 36 to be concatenated. For example, the quantum file manager 24 may first ensure that the qubits 32, 34, 38, and 40 are not entangled (i.e., are in an entanglement state of "not entangled") prior to concatenating the quantum files 30 and 36. Some examples may provide that the quantum file manager 24 also obtain exclusive access to the qubits 32, 34, 38, and 40 before attempting concatenation. Obtaining exclusive access may comprise operations for ensuring that no other processes are operating on the qubits 32, 34, 38, and 40, and/or indicating that access to the qubits 32, 34, 38, and 40 is locked to other processes while the concatenation operation is underway. In examples in which copies of one or more of the qubits 32, 34, 38, and 40 is performed, the quantum file manager 24 may also determine that the required number of qubits is available for allocation.

Figure 2A:
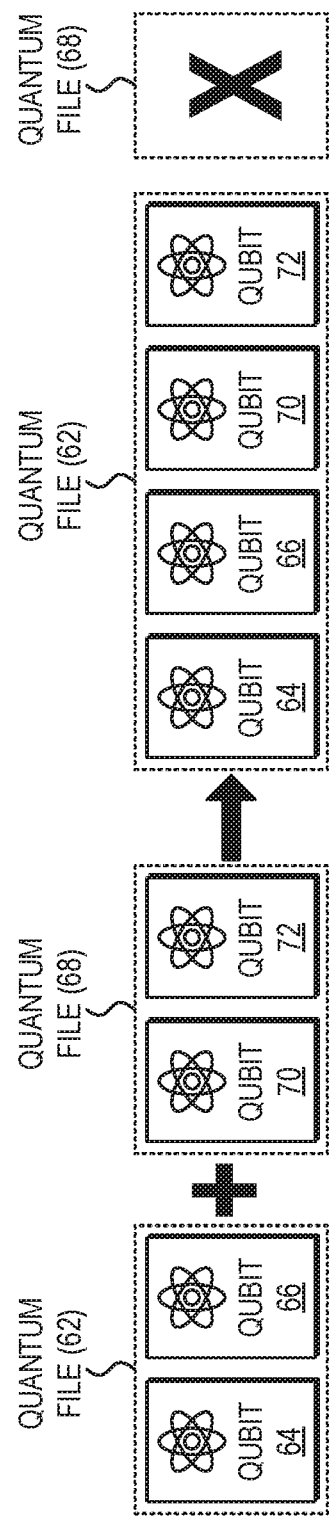
FIGS. 2A-2D are block diagrams illustrating alternate mechanisms for performing quantum file concatenation, according to some examples.

To illustrate alternate operations for performing quantum file concatenation according to some examples, FIGS. 2A-2D are provided. In FIG. 2A, a concatenation operation is shown in which no new quantum file is created, and one of the original quantum files is deleted after the concatenation operation is complete. Accordingly, FIG. 2A shows a first quantum file 62 comprising a first plurality of qubits 64 and 66 that is to be concatenated with a second quantum file 68 comprising a second plurality of qubits 70 and 72. In this example, the second plurality of qubits 70 and 72 are reassigned from the second quantum file 68 to the first quantum file 62 (e.g., by updating quantum file registry records corresponding to the first quantum file 62 and the second quantum file 68 in the quantum file registry 28 of FIG. 1). The end result of the concatenation operation of FIG. 2A is that the first quantum file 62 comprises a third plurality of qubits including the original qubits 64, 66, 70 and 72, while the second quantum file 68 comprises no qubits. The second quantum file 68 thus is deleted (e.g., by deleting a corresponding quantum file registry record of the quantum file registry 28 of FIG. 1).

Figure 2B:
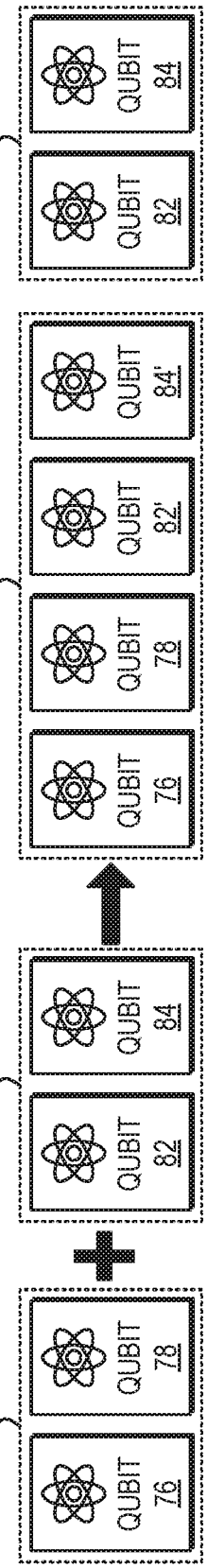

FIG. 2B illustrates an example in which no new quantum file is created, and neither of the original quantum files is deleted. As seen in FIG. 2B, a first quantum file 74 comprising a first plurality of qubits 76 and 78 is to be concatenated with a second quantum file 80 comprising a second plurality of qubits 82 and 84. The qubits 82 and 84 of the second quantum file 80 are copied into qubits 82' and 84', when are then assigned to the first quantum file 74 (e.g., by updating quantum file registry records corresponding to the first quantum file 74 in the quantum file registry 28 of FIG. 1). The end result of the concatenation operation of FIG. 2B is that the first quantum file 74 comprises a third plurality of qubits including the original qubits 76 and 78 and copied qubits 82' and 84', while the second quantum file 80 comprises the original qubits 82 and 84.

Figure 2C:
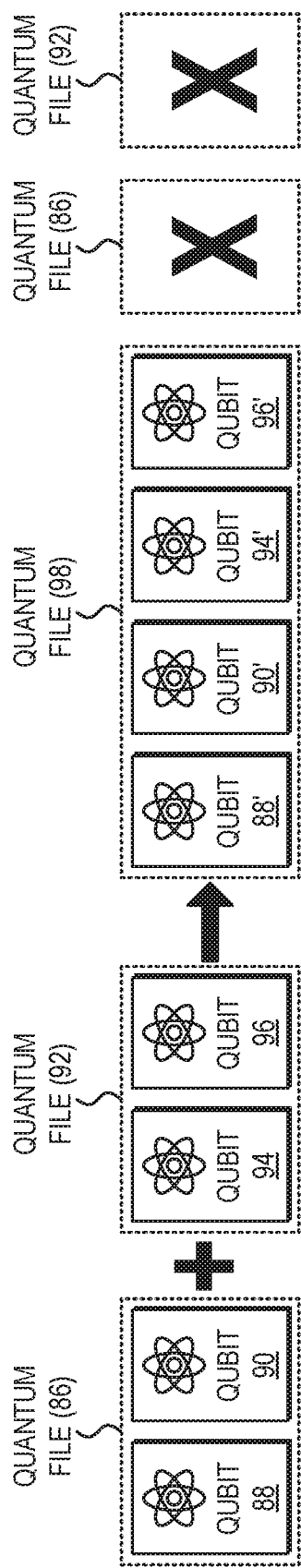

Referring now to FIG. 2C, a concatenation operation is shown in which a new concatenated quantum file is created, and both of the original quantum files are deleted after the concatenation operation is complete. Thus, FIG. 2C shows a first quantum file 86 comprising a first plurality of qubits 88 and 90 that is to be concatenated with a second quantum file 92 comprising a second plurality of qubits 94 and 96. In the example of FIG. 2C, the qubits 88, 90, 94, and 96 are copied into a third plurality of qubits 88',90',94', and 96', and are assigned to a new quantum file 98 (e.g., by creating a new quantum file registry record corresponding to the quantum file 98 in the quantum file registry 28 of FIG. 1). The original quantum files 86 and 92 no longer comprise any qubits, and thus are deleted (e.g., by deleting the corresponding quantum file registry records of the quantum file registry 28 of FIG. 1).

Figure 2D:
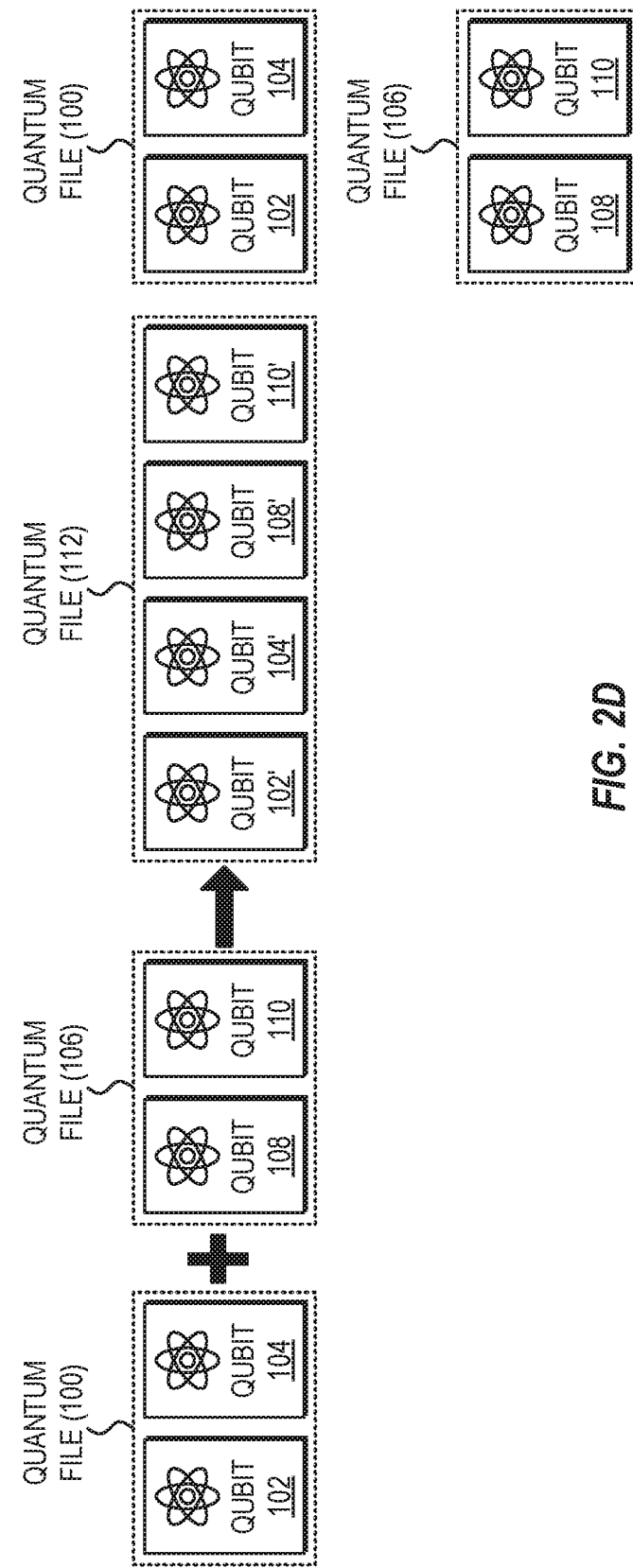

Finally, FIG. 2D illustrates an example in which a new concatenated quantum file is created, and both of the original quantum files are preserved. As seen in FIG. 2D, a first quantum file 100 comprising a first plurality of qubits 102 and 104 is to be concatenated with a second quantum file 106 comprising a second plurality of qubits 108 and 110. The qubits 102, 104, 108, and 110 are copied into a third plurality of qubits 102',104',108', and 110', and are assigned to a new quantum file 112 (e.g., by creating a new quantum file registry record corresponding to the quantum file 112 in the quantum file registry 28 of FIG. 1). The end result of the concatenation operation of FIG. 2D is that the new quantum file 112 comprises a third plurality of qubits including copied qubits 102',104',108', and 110', while the first quantum file 100 comprises the original qubits 102 and 104 and the second quantum file 106 comprises the original qubits 108 and 110.

Figure 3:
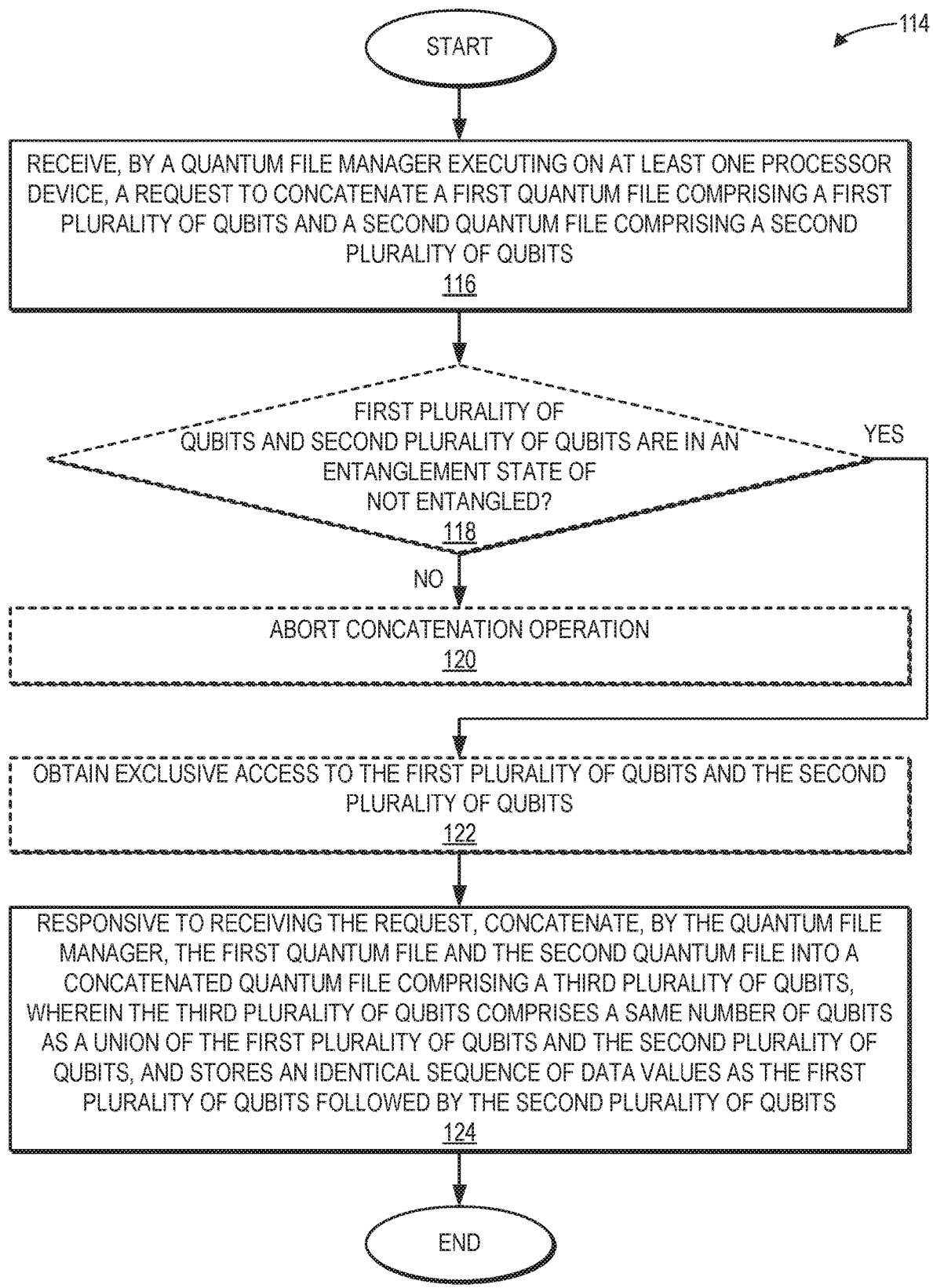
FIG. 3 is a flowchart illustrating operations for performing quantum file concatenation, according to one example.

FIG. 3 illustrates a flowchart 114 showing exemplary operations for performing quantum file concatenation, according to some examples. For the sake of clarity, elements of FIG. 1 are referenced in describing FIG. 3. Operations in FIG. 3 begin with the quantum file manager 24 executing on at least one processor device 16 receiving the request 58 to concatenate a first quantum file 30 comprising a first plurality of qubits 32 and 34 and a second quantum file 36 comprising a second plurality of qubits 38 and 40 (block 116). In some examples, the quantum file manager 24 may determine whether the first plurality of qubits 32 and 34 and the second plurality of qubits 38 and 40 are in an entanglement state of not entangled (based on, e.g., the quantum file registry 28 and/or the file system 42) (block 118). If not (i.e., the first plurality of qubits 32 and 34 and the second plurality of qubits 38 and 40 are in an entanglement state of "entangled"), the concatenation operation is aborted (block 120).

However, if the quantum file manager 24 determines at decision block 118 that the first plurality of qubits 32 and 34 and the second plurality of qubits 38 and 40 are in an entanglement state of "not entangled," the quantum file manager 24 in some examples may next obtain exclusive access to the first plurality of qubits 32 and 34 and the second plurality of qubits 38 and 40 (block 122). The quantum file manager 24 then concatenates the first quantum file 30 and the second quantum file 36 into a concatenated quantum file 60 comprising a third plurality of qubits 32',34',38', and 40', wherein the third plurality of qubits 32',34',38', and 40' comprises a same number of qubits as a union of the first plurality of qubits 32 and 34 and the second plurality of qubits 38 and 40, and stores an identical sequence of data values as the first plurality of qubits 32 and 34 followed by the second plurality of qubits 38 and 40 (block 124).

Figure 4:
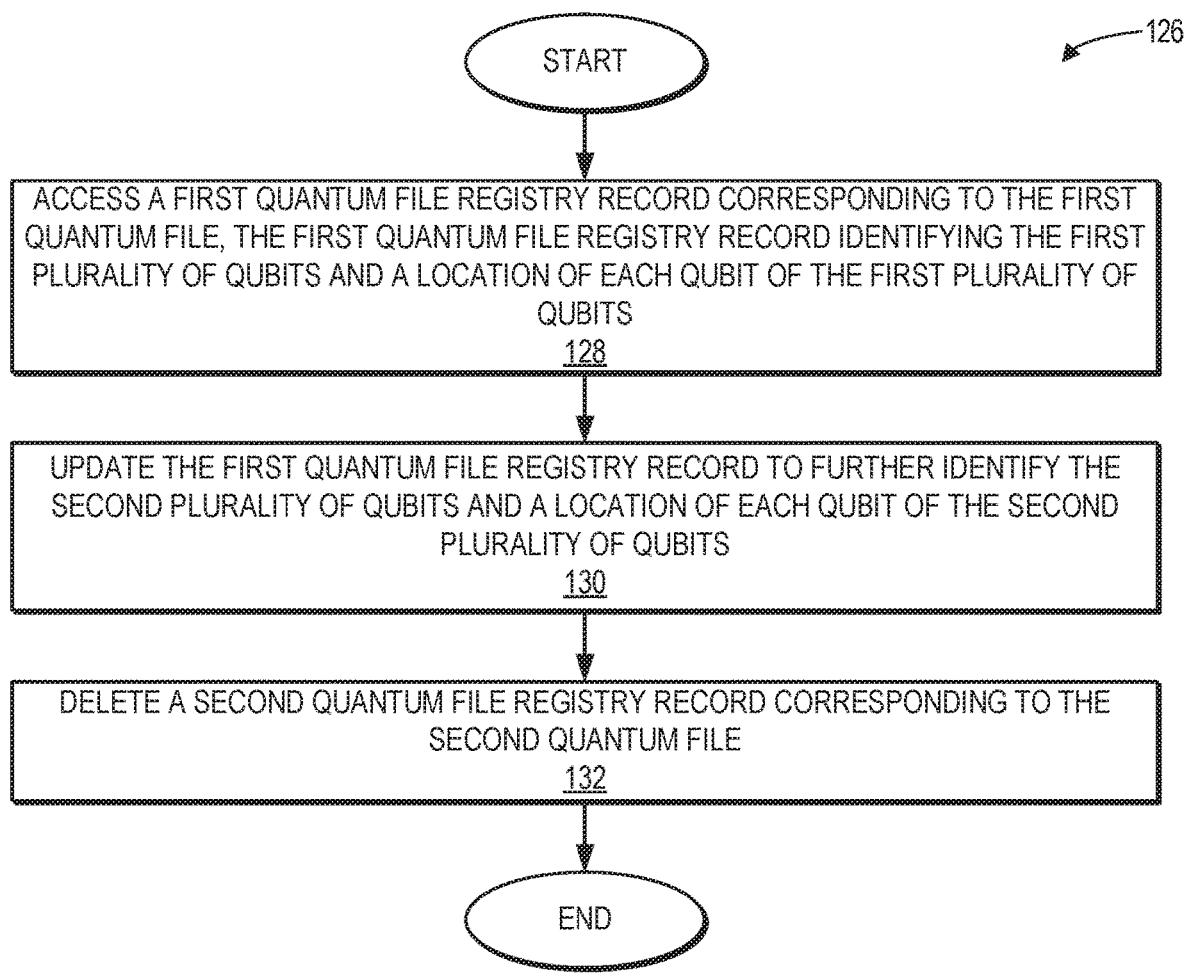
FIG. 4 is a flowchart illustrating operations for concatenating quantum files in which contents of a second quantum file are appended to a first quantum file and the second quantum file is deleted, according to one example.

To illustrate operations for concatenating quantum files in which contents of a second quantum file are appended to a first quantum file and the second quantum file is deleted, according to one example, FIG. 4 provides a flowchart 126. Elements of FIG. 1 are referenced in describing FIG. 4 for the sake of clarity. It is to be understood that the operations illustrated in FIG. 4 may correspond to the concatenation operation of block 124 of FIG. 3 and the operation illustrated in FIG. 2A. It is to be further understood that, in the context of FIG. 4, the first quantum file 30 is the concatenated quantum file 60, and the third plurality of qubits 32',34',38', and 40' comprises a union of the first plurality of qubits 32 and 34 and the second plurality of qubits 38 and 40.

In FIG. 4, operations begin with the quantum file manager 24 accessing a first quantum file registry record (e.g., the quantum file registry record 52) corresponding to the first quantum file 30, the first quantum file registry record 52 identifying the first plurality of qubits 32 and 34 and a location of each qubit of the first plurality of qubits 32 and 34 (block 128). The quantum file manager 24 updates the first quantum file registry record 52 to further identify the second plurality of qubits 38 and 40 and a location of each qubit of the second plurality of qubits 38 and 40 (i.e., as belonging to the first quantum file 30) (block 130). The quantum file manager then deletes a second quantum file registry record (e.g., the quantum file registry record 54) corresponding to the second quantum file 36 (block 132).

Figure 5:
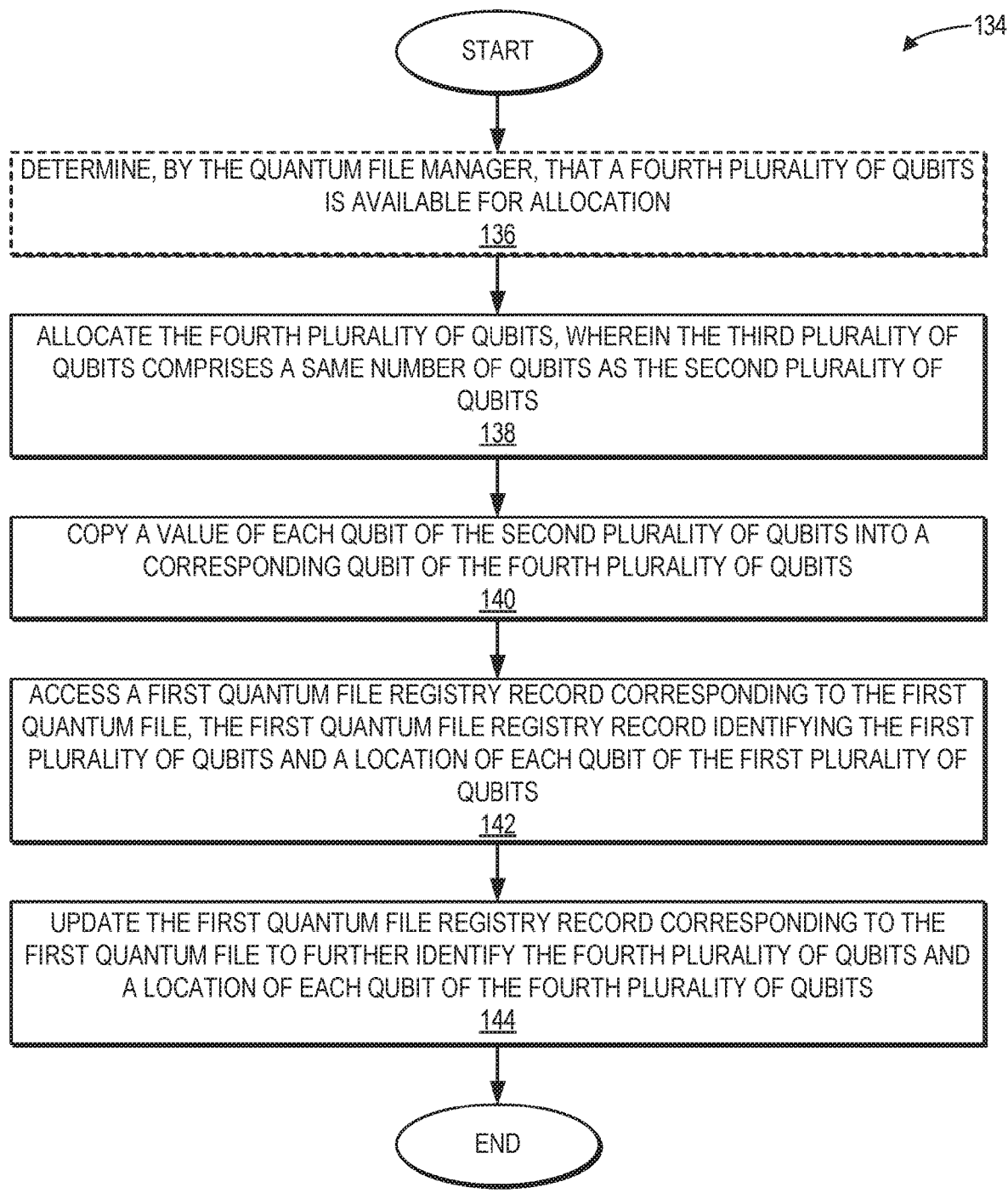
FIG. 5 is a flowchart illustrating operations for concatenating quantum files in which contents of a second quantum file are appended to a first quantum file and the second quantum file is preserved, according to one example.

FIG. 5 provides a flowchart 134 illustrating operations for concatenating quantum files in which contents of a second quantum file are appended to a first quantum file and the second quantum file is preserved, according to one example. For the sake of clarity, elements of FIG. 1 are referenced in describing FIG. 5. It is to be understood that the operations illustrated in FIG. 5 may correspond to the concatenation operation of block 124 of FIG. 3 and the operation illustrated in FIG. 2B. It is to be further understood that, in the context of FIG. 5, the first quantum file 30 is the concatenated quantum file 60, and the third plurality of qubits 32',34',38', and 40' comprises a union of the first plurality of qubits 32 and 34 and a fourth plurality of qubits 38' and 40' comprising copies of the second plurality of qubits 38 and 40.

In some examples, operations in FIG. 5 begin with the quantum file manager 24 determining that the fourth plurality of qubits 38' and 40' is available for allocation (block 136). The quantum file manager 24 then allocates the fourth plurality of qubits 38' and 40', wherein the fourth plurality of qubits 38' and 40' comprises a same number of qubits as the second plurality of qubits 38 and 40 (block 138). The quantum file manager 24 copies a value of each qubit of the second plurality of qubits 38' and 40' into a corresponding qubit of the fourth plurality of qubits 38' and 40' (block 140).

The quantum file manager 24 then accesses a first quantum file registry record (e.g., the first quantum file registry record 52) corresponding to the first quantum file 30, the first quantum file registry record 52 identifying the first plurality of qubits 32 and 34 and a location of each qubit of the first plurality of qubits 32 and 34 (block 142). The quantum file manager 24 next updates the first quantum file registry record 52 corresponding to the first quantum file 30 to further identify the fourth plurality of qubits 38' and 40' and a location of each qubit of the fourth plurality of qubits 38' and 40' (i.e., as belonging to the first quantum file 30) (block 144).

Figure 6:
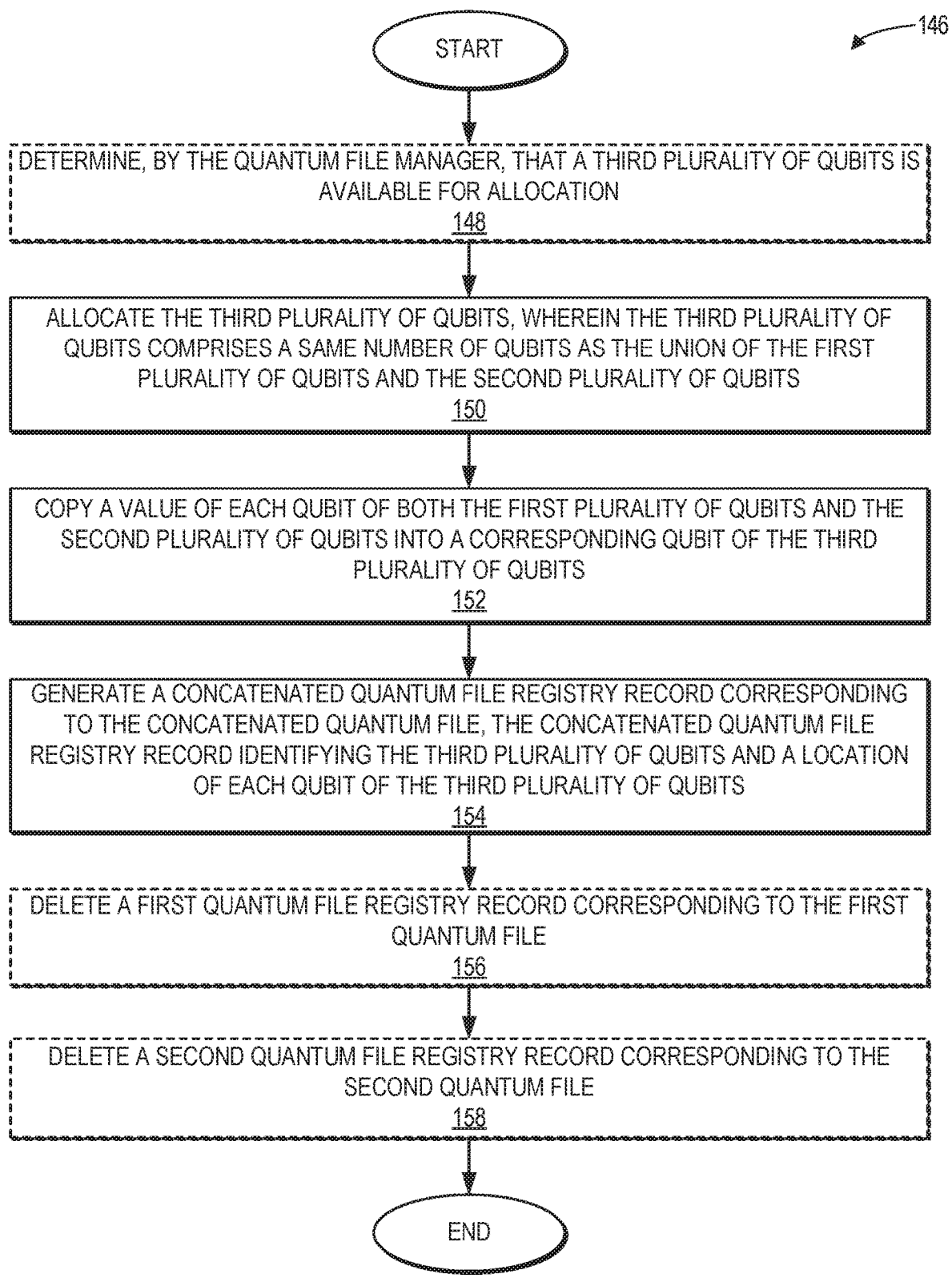
FIG. 6 is a flowchart illustrating operations for concatenating quantum files in which contents of a first quantum file and a second quantum file are appended in a new concatenated quantum file, according to one example.

To illustrate operations for concatenating quantum files in which contents of a first quantum file and a second quantum file are appended in a new concatenated quantum file according to one example, FIG. 6 provides a flowchart 146. Elements of FIG. 1 are referenced in describing FIG. 6 for the sake of clarity. It is to be understood that the operations illustrated in FIG. 6 may correspond to the concatenation operation of block 124 of FIG. 3 and the operations illustrated in FIGS. 2C and/or 2D. It is to be further understood that, in the context of FIG. 6, the concatenated quantum file 60 is a new quantum file separate from the first quantum file 30 and the second quantum file 36, and the third plurality of qubits 32',34',38', and 40' comprises copies of the first plurality of qubits 32 and 34 and the second plurality of qubits 38 and 40.

Operations in FIG. 6 begin with the quantum file manager 24 in some examples determining that the third plurality of qubits 32',34',38', and 40' is available for allocation (block 148). The quantum file manager 24 then allocates the third plurality of qubits 32',34',38', and 40', wherein the third plurality of qubits 32',34',38', and 40' comprises a same number of qubits as the union of the first plurality of qubits 32 and 34 and the second plurality of qubits 38 and 40 (block 150). The quantum file manager 24 next copies a value of each qubit of both the first plurality of qubits 32 and 34 and the second plurality of qubits 38 and 40 into a corresponding qubit of the third plurality of qubits 32',34',38', and 40' (block 152).

The quantum file manager 24 generates a concatenated quantum file registry record (such as the quantum file registry record 56) corresponding to the concatenated quantum file 60, the concatenated quantum file registry record 56 identifying the third plurality of qubits 32',34',38', and 40' and a location of each qubit of the third plurality of qubits 32',34',38', and 40' (block 154). In some examples, the quantum file manager 24 deletes a first quantum file registry record (e.g., the quantum file registry record 52) corresponding to the first quantum file 30 (block 156). The quantum file manager 24 may also delete a second quantum file registry record (such as the quantum file registry record 54) corresponding to the second quantum file 36 (block 158).

Figure 7:
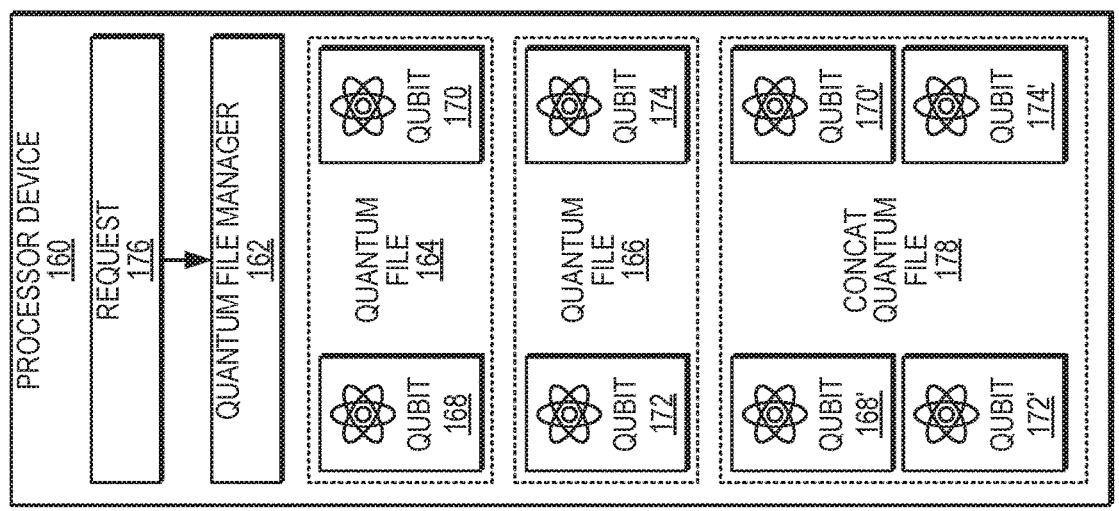
FIG. 7 is a simpler block diagram of the quantum computing system of FIG. 1 for performing quantum file concatenation, according to one example.

FIG. 7 is a simpler block diagram of the quantum computing system 10 of FIG. 1 for performing quantum file concatenation, according to one example. In FIG. 7, a processor device 160 provides a quantum file manager 162 that provides functionality corresponding to that of the quantum file manager 24 of FIG. 1. In the example of FIG. 7, a first quantum file 164 and a second quantum file 166 have been implemented in the processor device 160. The first quantum file 164 is made up of a first plurality of qubits 168 and 170, while the second quantum file 166 is made up of a second plurality of qubits 172 and 174. Upon receiving a request 176 to concatenate the first quantum file 164 and the second quantum file 166, the quantum file manager 162 concatenates the first quantum file 164 and the second quantum file 166 into a concatenated quantum file ("CONCAT QUANTUM FILE") 178 comprising a third plurality of qubits 168',170',172', and 174', wherein the third plurality of qubits 168',170',172', and 174' comprises a same number of qubits as a union of the first plurality of qubits 168 and 170 and the second plurality of qubits 172 and 174.

Figure 8:
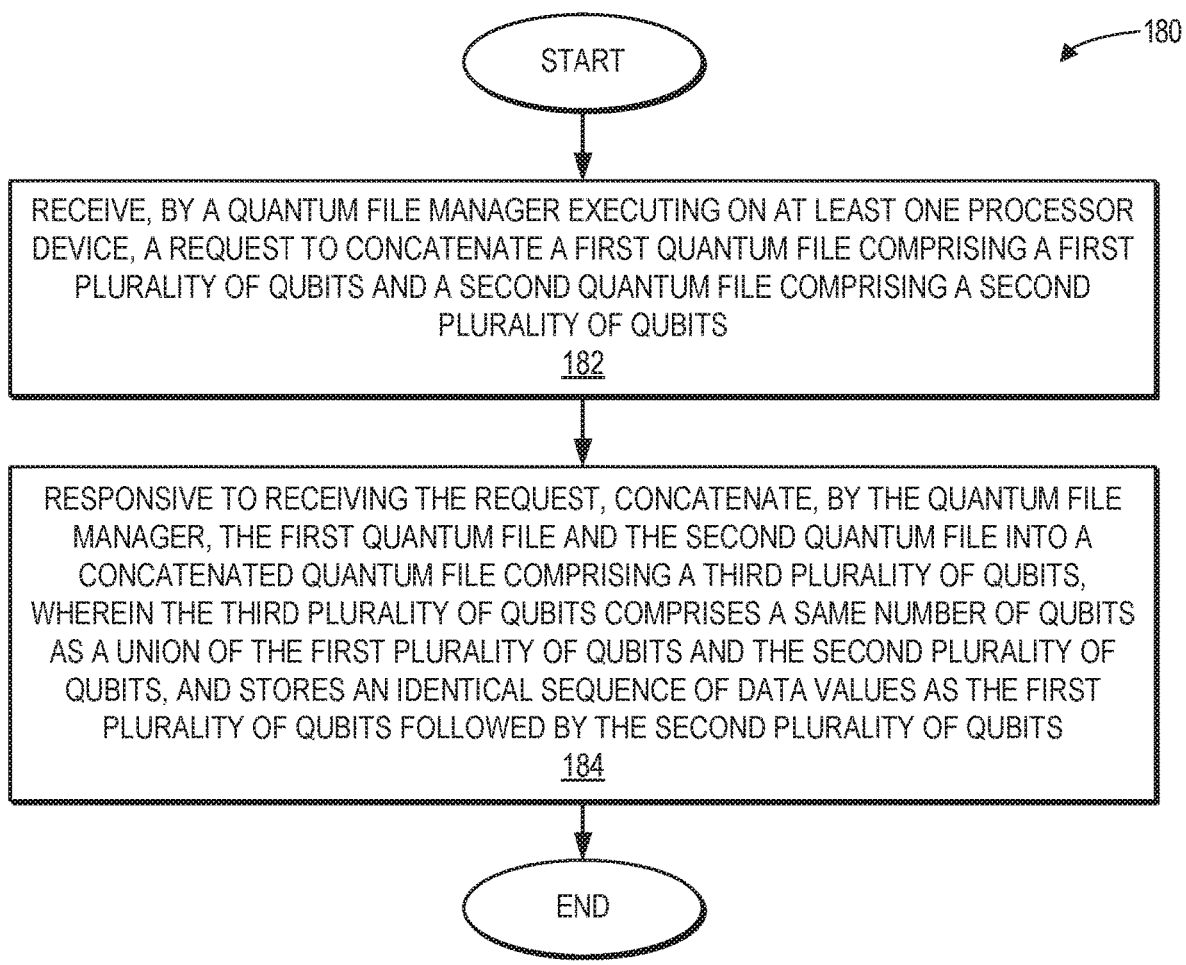
FIG. 8 is a flowchart of a simplified method for performing quantum file concatenation in the quantum computing system of FIG. 7, according to one example.

FIG. 8 provides a flowchart 180 of a simplified method for performing quantum file concatenation in the processor device 160 of FIG. 7, according to one example. For the sake of clarity, elements of FIG. 7 are referenced in describing FIG. 8. In FIG. 8, operations begin with the quantum file manager 162 executing on at least one processor device 160 receiving the request 176 to concatenate the first quantum file 164 comprising the first plurality of qubits 168 and 170 and the second quantum file 166 comprising the second plurality of qubits 172 and 174 (block 182). Responsive to receiving the request 176, the quantum file manager 162 concatenates the first quantum file 164 and the second quantum file 166 into the concatenated quantum file 178 comprising the third plurality of qubits 168',170',172', and 174', wherein the third plurality of qubits 168',170',172', and 174' comprises a same number of qubits as a union of the first plurality of qubits 168 and 170 and the second plurality of qubits 172 and 174, and stores an identical sequence of data values as the first plurality of qubits 168 and 170 followed by the second plurality of qubits 172 and 174 (block 184).

Figure 9:
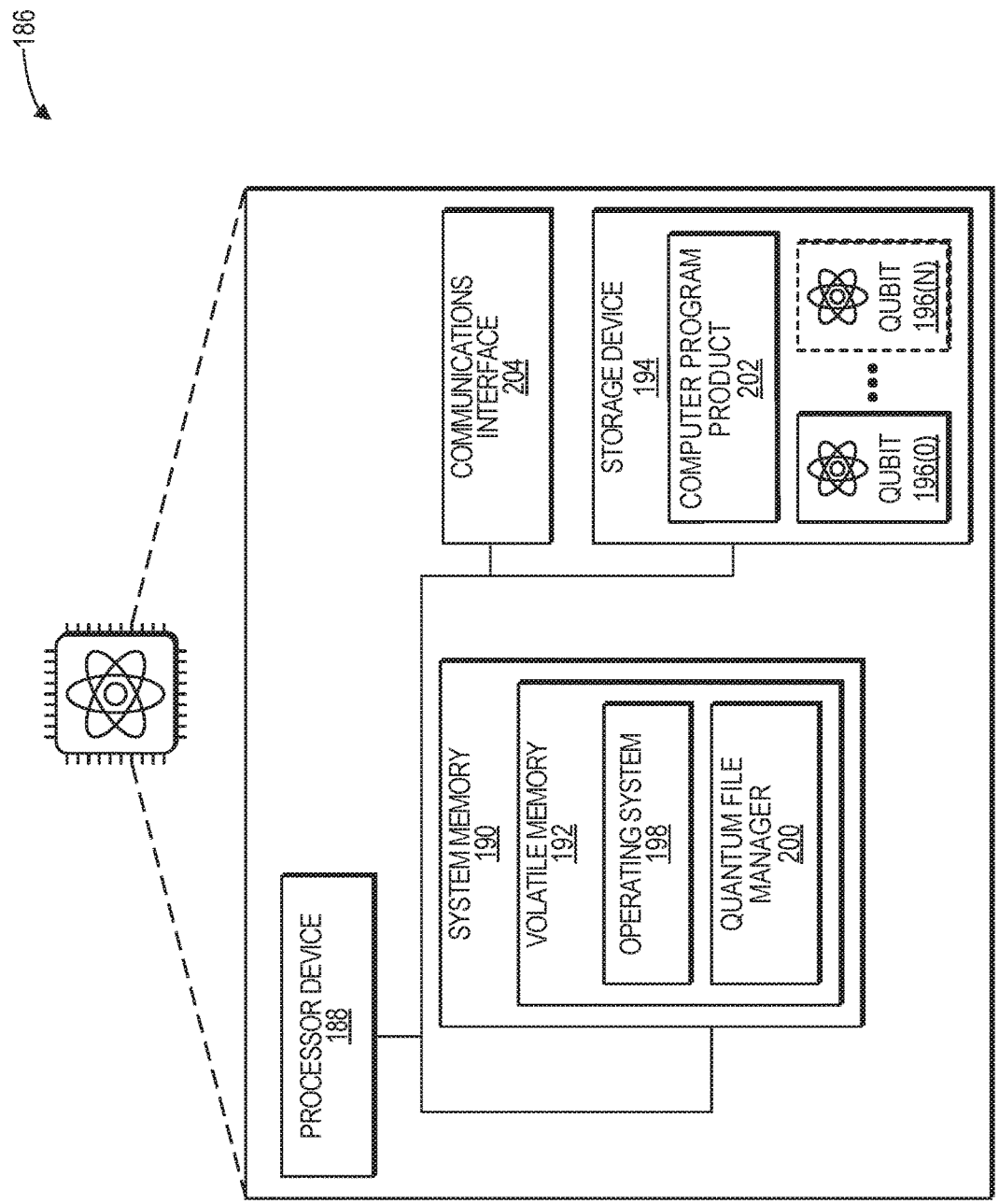
FIG. 9 is a block diagram of a quantum computing device suitable for implementing examples, according to one example.

FIG. 9 is a block diagram of a quantum computing device 186, such as the quantum computing device 12 and the quantum computing device 18 of FIG. 1, suitable for implementing examples according to one example. The quantum computing device 186 may comprise any suitable quantum computing device or devices. The quantum computing device 186 can operate using classical computing principles or quantum computing principles. When using quantum computing principles, the quantum computing device 186 performs computations that utilize quantum-mechanical phenomena, such as superposition and entanglement. The quantum computing device 186 may operate under certain environmental conditions, such as at or near zero degrees (0°) Kelvin. When using classical computing principles, the quantum computing device 186 utilizes binary digits that have a value of either zero (0) or one (1).

The quantum computing device 186 includes a processor device 188 and the system memory 190. The processor device 188 can be any commercially available or proprietary processor suitable for operating in a quantum environment. The system memory 190 may include volatile memory 192 (e.g., random-access memory (RAM)). The quantum computing device 186 may further include or be coupled to a non-transitory computer-readable storage medium such as a storage device 194, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 194 and other drives associated with computer-readable media and computer-usable media may provide non-volatile storage of data, data structures, computer-executable instructions, and the like. The storage device may also provide functionality for storing one or more qubits 196(0)-196(N).

A number of modules can be stored in the storage device 194 and in the volatile memory 192, including an operating system 198 and one or more modules, such as a quantum file manager 200. All or a portion of the examples may be implemented as a computer program product 202 stored on a transitory or non-transitory computer-usable or computer-readable storage medium, such as the storage device 194, which includes complex programming instructions, such as complex computer-readable program code, to cause the processor device 188 to carry out the steps described herein. Thus, the computer-readable program code can comprise software instructions for implementing the functionality of the examples described herein when executed on the processor device 188. An operator may also be able to enter one or more configuration commands through a keyboard (not illustrated), a pointing device such as a mouse (not illustrated), or a touch-sensitive surface such as a display device. The quantum computing device 186 may also include a communications interface 204 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum file manager executing on at least one processor device, a request to concatenate a first quantum file comprising a first plurality of qubits and a second quantum file comprising a second plurality of qubits; and
   responsive to receiving the request, concatenating, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;
   wherein:
   the first quantum file is the concatenated quantum file;
   the third plurality of qubits is the union of the first plurality of qubits and the second plurality of qubits; and
   concatenating the first quantum file and the second quantum file into the concatenated quantum file comprises:
   accessing a first quantum file registry record corresponding to the first quantum file, the first quantum file registry record identifying the first plurality of qubits and a location of each qubit of the first plurality of qubits;
   updating the first quantum file registry record to further identify the second plurality of qubits and a location of each qubit of the second plurality of qubits; and
   deleting a second quantum file registry record corresponding to the second quantum file.

2. The method of claim 1, further comprising determining that the first plurality of qubits and the second plurality of qubits are in an entanglement state of not entangled;
   wherein concatenating the first quantum file and the second quantum file into the concatenated quantum file is responsive to determining that the first plurality of qubits and the second plurality of qubits are in an entanglement state of not entangled.

3. The method of claim 1, further comprising obtaining exclusive access to the first plurality of qubits and the second plurality of qubits.

4. A quantum computing system, comprising:
   a quantum computing device comprising:
   a memory; and
   at least one processor device coupled to the memory to:
   receive, by a quantum file manager executing on the at least one processor device, a request to concatenate a first quantum file comprising a first plurality of qubits and a second quantum file comprising a second plurality of qubits; and
   responsive to receiving the request, concatenate, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;
   wherein:
   the first quantum file is the concatenated quantum file;
   the third plurality of qubits is the union of the first plurality of qubits and the second plurality of qubits; and
   to concatenate the first quantum file and the second quantum file into the concatenated quantum file the at least one processor device is to:
   access a first quantum file registry record corresponding to the first quantum file, the first quantum file registry record identifying the first plurality of qubits and a location of each qubit of the first plurality of qubits;
   update the first quantum file registry record to further identify the second plurality of qubits and a location of each qubit of the second plurality of qubits; and
   delete a second quantum file registry record corresponding to the second quantum file.

5. The quantum computing system of claim 4, wherein the at least one processor device is further to determine that the first plurality of qubits and the second plurality of qubits are in an entanglement state of not entangled;
   wherein the at least one processor device is to concatenate the first quantum file and the second quantum file into the concatenated quantum file responsive to determining that the first plurality of qubits and the second plurality of qubits are in an entanglement state of not entangled.

6. The quantum computing system of claim 4, wherein the at least one processor device is further to obtain exclusive access to the first plurality of qubits and the second plurality of qubits.

7. A method comprising:
receiving, by a quantum file manager executing on at least one processor device, a request to concatenate a first quantum file comprising a first plurality of qubits and a second quantum file comprising a second plurality of qubits; and
responsive to receiving the request, concatenating, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;
wherein:
the first quantum file is the concatenated quantum file;
the third plurality of qubits is the union of the first plurality of qubits and a fourth plurality of qubits; and
concatenating the first quantum file and the second quantum file into the concatenated quantum file comprises:
allocating the fourth plurality of qubits, wherein the fourth plurality of qubits comprises a same number of qubits as the second plurality of qubits;
copying a value of each qubit of the second plurality of qubits into a corresponding qubit of the fourth plurality of qubits;
accessing a first quantum file registry record corresponding to the first quantum file, the first quantum file registry record identifying the first plurality of qubits and a location of each qubit of the first plurality of qubits; and
updating the first quantum file registry record corresponding to the first quantum file to further identify the fourth plurality of qubits and a location of each qubit of the fourth plurality of qubits.

8. A quantum computing system, comprising:
a quantum computing device comprising:
a memory; and
at least one processor device coupled to the memory to:
receive, by a quantum file manager executing on the at least one processor device, a request to concatenate a first quantum file comprising a first plurality of qubits and a second quantum file comprising a second plurality of qubits; and
responsive to receiving the request, concatenate, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;
wherein:
the first quantum file is the concatenated quantum file;
the third plurality of qubits is the union of the first plurality of qubits and a fourth plurality of qubits; and
to concatenate the first quantum file and the second quantum file into the concatenated quantum file the at least one processor device is to:
allocate the fourth plurality of qubits, wherein the fourth plurality of qubits comprises a same number of qubits as the second plurality of qubits;
copy a value of each qubit of the second plurality of qubits into a corresponding qubit of the fourth plurality of qubits;
access a first quantum file registry record corresponding to the first quantum file, the first quantum file registry record identifying the first plurality of qubits and a location of each qubit of the first plurality of qubits; and
update the first quantum file registry record corresponding to the first quantum file to further identify the fourth plurality of qubits and a location of each qubit of the fourth plurality of qubits.

9. A method comprising:
receiving, by a quantum file manager executing on at least one processor device, a request to concatenate a first quantum file comprising a first plurality of qubits and a second quantum file comprising a second plurality of qubits; and
responsive to receiving the request, concatenating, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;
wherein concatenating the first quantum file and the second quantum file into the concatenated quantum file comprises:
allocating the third plurality of qubits, wherein the third plurality of qubits comprises a same number of qubits as the union of the first plurality of qubits and the second plurality of qubits;
copying a value of each qubit of both the first plurality of qubits and the second plurality of qubits into a corresponding qubit of the third plurality of qubits; and
generating a concatenated quantum file registry record corresponding to the concatenated quantum file, the concatenated quantum file registry record identifying the third plurality of qubits and a location of each qubit of the third plurality of qubits.

10. A quantum computing system, comprising:
a quantum computing device comprising:
a memory; and
at least one processor device coupled to the memory to:
receive, by a quantum file manager executing on the at least one processor device, a request to concatenate a first quantum file comprising a first plurality of qubits and a second quantum file comprising a second plurality of qubits; and
responsive to receiving the request, concatenate, by the quantum file manager, the first quantum file and the second quantum file into a concatenated quantum file comprising a third plurality of qubits, wherein the third plurality of qubits comprises a same number of qubits as a union of the first plurality of qubits and the second plurality of qubits, and stores an identical sequence of data values as the first plurality of qubits followed by the second plurality of qubits;

wherein to concatenate the first quantum file and the second quantum file into the concatenated quantum file the at least one processor device is to:

allocate the third plurality of qubits, wherein the third plurality of qubits comprises a same number of qubits as the union of the first plurality of qubits and the second plurality of qubits;

copy a value of each qubit of both the first plurality of qubits and the second plurality of qubits into a corresponding qubit of the third plurality of qubits; and generate a concatenated quantum file registry record corresponding to the concatenated quantum file, the concatenated quantum file registry record identifying the third plurality of qubits and a location of each qubit of the third plurality of qubits.

\* \* \* \* \*